United States Patent [19]
Bisconti

[11] Patent Number: 5,814,254
[45] Date of Patent: Sep. 29, 1998

[54] INJECTION MOLDING METHOD FOR SOLES HAVING A TREADING SURFACE WITH COLORED SECTIONS AND PRODUCED WITH EXPANSIBLE AND CROSS-LINKING "EVA"COMPOUNDS

[75] Inventor: Bruno Bisconti, Civitanova Marche, Italy

[73] Assignee: Finproject-S.p.A., Rome, Italy

[21] Appl. No.: 806,683

[22] Filed: Feb. 26, 1997

[30] Foreign Application Priority Data

Apr. 19, 1996 [IT] Italy .................................... AN960009

[51] Int. Cl.⁶ ..................................................... B29C 44/12
[52] U.S. Cl. ........................... 264/46.4; 264/54; 264/245; 264/278
[58] Field of Search ............................ 264/54, 46.4, 245, 264/278

[56] References Cited

U.S. PATENT DOCUMENTS

| | | | |
|---|---|---|---|
| 4,436,276 | 3/1984 | Donahue | 264/278 |
| 4,674,204 | 6/1987 | Sullivan et al. | 264/46.4 |
| 4,876,053 | 10/1989 | Norton et al. | 264/278 |
| 5,141,578 | 8/1992 | Yang | 264/245 |
| 5,318,645 | 6/1994 | Yang | 264/245 |
| 5,342,569 | 8/1994 | Murasaki | 264/278 |
| 5,503,786 | 4/1996 | Yang | 264/46.4 |
| 5,639,403 | 6/1997 | Ida et al. | 264/278 |

*Primary Examiner*—Allen R. Kuhns
*Attorney, Agent, or Firm*—Beveridge, DeGrandi, Weilacher & Young, LLP

[57] ABSTRACT

This invention concerns an injection molding process for soles having a colored treading surface produced with expansible and cross-linking "EVA" compounds involving the use of colored inserts molded with the same molding material used for sole, but of a different color, fed into cups on the bottom of the mold impression and shut by caps also molded in the same material used to mold the soles.

16 Claims, 2 Drawing Sheets

INJECTION MOLDING METHOD FOR SOLES HAVING A TREADING SURFACE WITH COLORED SECTIONS AND PRODUCED WITH EXPANSIBLE AND CROSS-LINKING "EVA"COMPOUNDS

SUMMARY OF THE INVENTION

This patent application concerns an injection molding method for soles having a treading surface with colored sections, and produced with expansible and cross-linking "EVA" compounds.

The abbreviation "EVA" refers to "vinyl-acetate ethylene copolymer" which, according to the type of additive used, may be thermoplastic or expansible and cross-linking.

In the case of the latter type, an expanding powder additive is used which decomposes at a specific temperature to produce gases which give rise to a typical phenomenon which occurs in injection molding using this type of "EVA", consisting of the instantaneous expansion of the part as soon as the mold is opened.

In particular the dimensions of the part increase rapidly while the proportions and shape remain unaltered thus maintaining a ratio of perfect similarity with respect to the impression of the matrix.

Expansible and cross-linking "EVA", thanks above all to its low cost, is widely used in the footwear sector for the production of inexpensive injection molded soles.

To date it has not been possible to produce injection molded soles in expansible and cross-linking "EVA" compounds, having a treading surface with one or more different colored sections with respect to the sole; in fact, this can only be achieved by painting the single-color sole after molding.

The purpose of this invention is to design a method which makes it possible to obtain during the same molding stage, a sole whose treading surface has different colored sections with respect to the color of the sole, in order to cut the costs currently sustained to paint the sole after molding.

The method in question is based on the idea of equipping the sole mold with one or more inserts premolded in the same material used to mold the sole but of a different color; the inserts are molded by heating the expansible and cross-linking "EVA" compound granules to a melting point without reaching the higher temperature which triggers the cross-linking and decomposition process of the expanding fillers.

The method in question also involves the use of a special mold which, on one hand, ensures that the inserts pre-mounted during the injection stage are securely fixed, and on the other prevents mixing, along the edge of the inserts, between the molding material of the sole and that of the inserts, which would produce unattractive streaks or stains of different shades of color with respect to the colors of the two materials.

It is important to consider in fact that the granules of the "EVA" based compound are heated to a melting point before being injected into the mold, in which the inserts also reach melting temperature, so that one of the most difficult problems resolved was in fact that of avoiding with absolutely security the possibility that streaks or halos of different shades would appear on the treading surface due to the mixing of different colored molten "EVA" granules.

In order to resolve this problem, the method according to the invention entails the use of a special mold with an impression having the same number of annular ribs on its bottom wall as the colored inserts which are pre-fitted on the mold and which are housed precisely in the cup delimited by each of said annular ribs.

According to the method in question, once each of the cups has been mounted with its respective insert, the cup is shut with a sealing cap consisting of a shaped pad premolded in the same material as the sole, which is however heated to a melting point without attaining the cross-linking and decomposition temperature of the expansion fillers, as previously mentioned for molding of the inserts.

Each cap is fixed to its respective cup by means of a series of closely packed rods projecting from the internal surface of the cover which shuts the mold matrix.

When the cover of the mold is shut over the matrix, said rods penetrate into said caps, which are thus held securely over the cups even during the injection phase, despite the fact that the flow of liquid enters the mold at a very high pressure.

Moreover, the seal ensured by said caps together with the annular ribs on the bottom of the matrix impression, exclude any possible mixing between the fluid mass injected into the mold and that of the inserts which melt in their respective cups.

BRIEF DESCRIPTION OF THE DRAWINGS

For clarity the description of the process continues with reference to the enclosed drawings which are intended for purposes of illustration and not in a limiting sense, where.

DETAILED DESCRIPTION OF THE INVENTION

Figure 1:
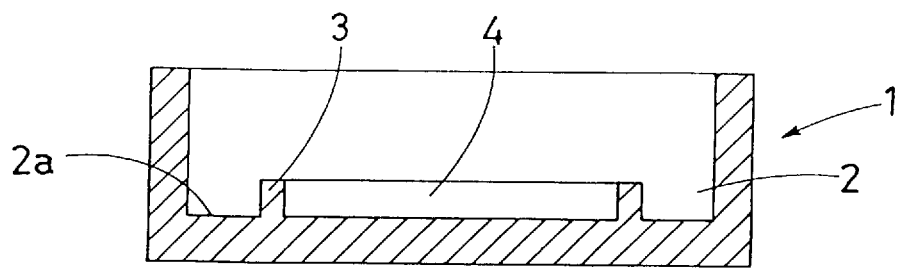
FIG. 1 shows the open mold cross-sectioned with a transversal plane of its impression.
Figure 2:
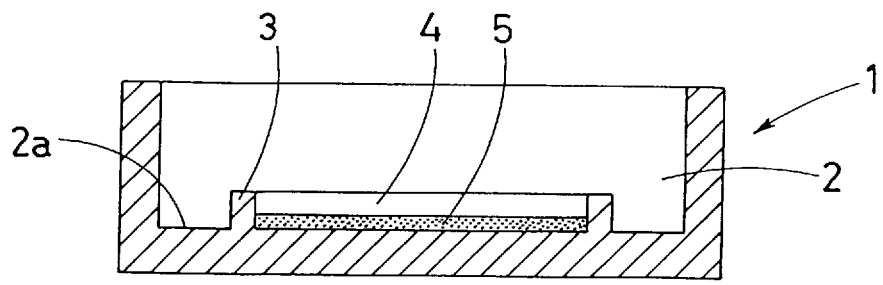
FIG. 2 is similar to FIG. 1 with the addition of an insert mounted in the impression of the mold.
Figure 3:
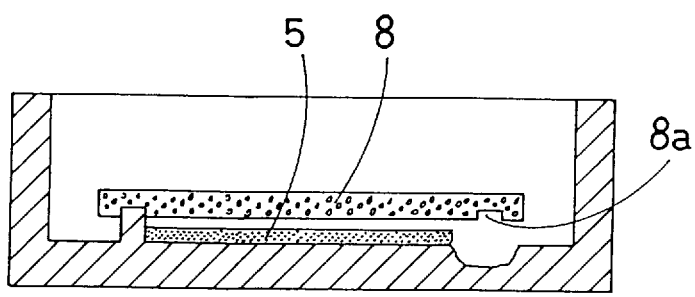
FIG. 3 is similar to FIG. 2 with the addition of the cap which shuts the cup housing the insert.
Figure 4:
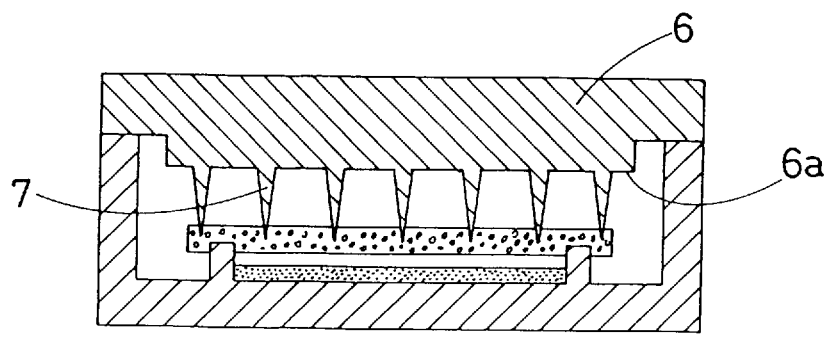
FIG. 4 is similar to FIG. 3 with the addition of the mold cover.

The method according to the invention entails the use of a special mold (1) having an impression (2) with the same number of annular ribs (3) on its bottom wall (2a) delimiting the same number of cups (4) conforming exactly to the colored inserts (5) pre-mounted on the mold (1); the cover (6) of mold (1) having in proximity of each of the cups (4), a series of closely packed rods (7) projecting from its internal surface (6a).

The method according to the invention also involves the use of inserts (5) consisting of plates molded in the same materials used to mold the sole, but of a different color; said inserts (5) being molded by heating the granules of expanding and cross-linking "EVA" based compound to a melting point, without however reaching the higher temperature which triggers the cross-linking and decomposition of the expanding fillers.

The method according to the invention also entails the use of caps (8) which shut said cups (4), consisting of pads molded in the same material used to mold the sole; the caps (8) being molded by heating the granules of expanding and cross-linking "EVA" based compound to a melting point, without however reaching the higher temperature which triggers the cross-linking and decomposition of the expanding fillers.

In particular, said caps (8) are provided on their bottom surface with a perimeter groove (8a) designed to couple precisely with the annular rib (3) delimiting each cup (4) housing the inserts (5).

In order to ensure said coupling, the thickness of the colored inserts (5) is inferior to the height of the annular ribs (3).

In consideration of the foregoing, the method according to the invention provides that the molding phase of the sole occurs as follows:

a) fitting onto the mold (1) of the inserts (5), each of which is housed into a corresponding cup (4);

b) fitting onto the mold (1) of the caps (8), each of which is housed above a corresponding cup (4) so as to ensure coupling between the perimeter groove (8a) of the cap (8) and the rib (3) delimiting the cup (4);

c) closing of the mold;

d) injection of the molding material;

e) opening of the mold after a time that ensures cross-linking and decomposition of the expanding fillers simultaneously in the injected mass, in the molten mass of the inserts (5) and in the molten mass of the caps (8).

Figure 5:
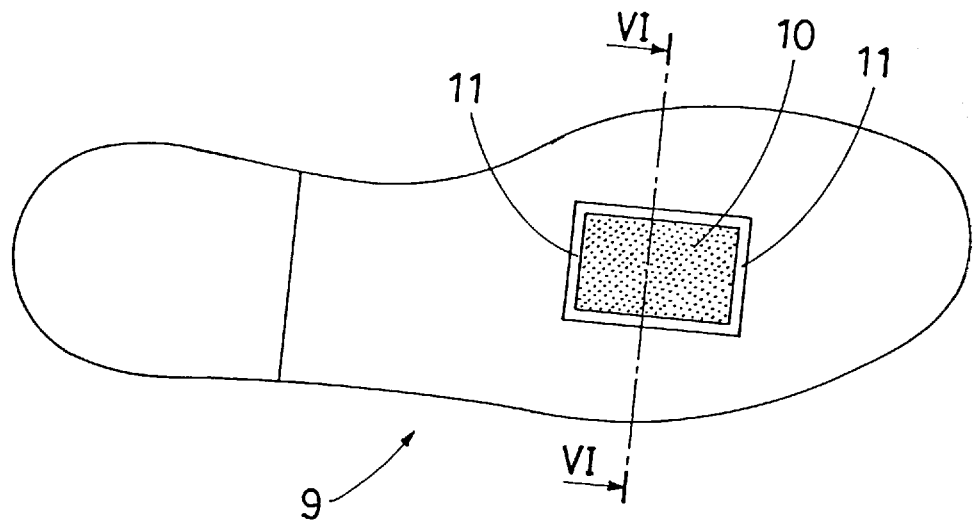
FIG. 5 shows the treading surface of a sole realised using the method according to the invention.
Figure 6:
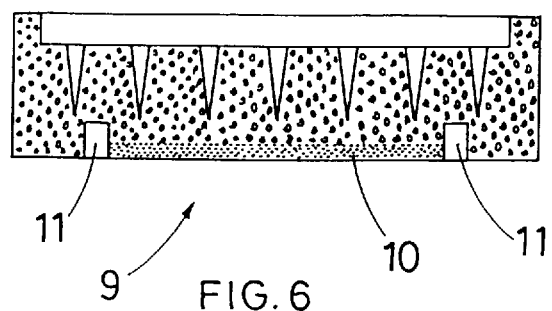
FIG. 6 is a cross-section of the sole in FIG. 5 with the transversal plane VI—VI of FIG. 5.

As shown in FIGS. 5 and 6, the sole (9) obtained with the method according to the invention is provided on its treading surface with one or more sections (10) of different colors with respect to that of the sole (9) delimited by a run (11) that corresponds to the impression produced by the annular rib (3) delimiting the cup (4) in which the insert (5) is fitted and from which each colored section (10) is produced.

I claim:

1. A molding method, comprising the steps of:

providing a mold with a cup portion defined at least in part by a rib;

fitting an insert in said cup portion of said mold, said insert being formed of a first molding material;

fitting a cap on said cup portion of said mold, said cap being formed of a second molding material;

closing said mold;

injecting into said mold a third molding material;

causing the first molding material of the insert and the second molding material of the cap to reach a molten state; and opening the mold after a time that ensures crosslinking and decomposition of expanding fillers simultaneously in the injected third molding material, a molten mass of the insert and a molten mass of the cap.

2. The molding method of claim 1, wherein:

said first molding material is a different color than said third molding material.

3. The molding method of claim 2, wherein:

said second molding material is the same color as said third molding material.

4. The molding method of claim 1, wherein:

said conditions include a pressure condition, a temperature condition, and a temporal condition.

5. The molding method of claim 4, wherein:

said first molding material is a different color than said third molding material and said second molding material is the same color as said third molding material.

6. The molding method of claim 1, further comprising the steps of:

providing said cap with a groove arranged in correspondence with a shape of said rib, and positioning said cap on said cup portion such that said rib is received in said groove.

7. The molding method of claim 6, wherein:

a height of said insert is less than a height of said rib.

8. The molding method of claim 1, wherein said step of closing said mold includes the steps of:

providing a cover for said mold; and closing said mold with said cover.

9. The molding method of claim 8, wherein:

said cover includes at least one rod extending into an interior of said mold, said rod being dimensioned and arranged to engage said cap portion.

10. The molding method of claim 9, wherein:

said rod secures said cap on said cup portion.

11. The molding method of claim 10, further comprising the step of:

providing said cap with a groove arranged in correspondence with a shape of said rib; and positioning said cap on said cup portion such that said rib is engaged with said groove, wherein said rod extending from said mold secures said cap such that said rib remains engaged with said groove.

12. The molding method of claim 11, wherein:

said at least one rod comprises a plurality of closely packed rods.

13. The molding method of claim 12, wherein:

said first molding material is a different color than said third molding material and said second molding material is the same color as said third molding material.

14. The molding method of claim 1, wherein:

said insert and said cap are formed by heating expansible and cross-linking "EVA" compound granules to a melting point without reaching a temperature associated with cross-linking and decomposition.

15. The molding method of claim 1, wherein:

said cap is fit on said cup portion such that a seal is formed to prevent mixing between said third molding material and said insert disposed in said cup portion.

16. The molding method of claim 1, further comprising the step of:

heating said third molding material to a melting point before injecting said third molding material in said mold.

* * * * *